US005909070A

United States Patent [19]
Taghezout

[11] Patent Number: 5,909,070
[45] Date of Patent: Jun. 1, 1999

[54] TWO-PHASE ELECTROMECHANICAL TRANSDUCER AND ELECTROMECHANICAL DEVICE INCLUDING AT LEAST ONE SUCH TRANSDUCER

[75] Inventor: Daho Taghezout, Morges, Switzerland

[73] Assignee: Eta SA Fabriques d'Ebauches, Grenchen, Switzerland

[21] Appl. No.: 08/980,970

[22] Filed: Dec. 1, 1997

[30] Foreign Application Priority Data

Dec. 4, 1996 [CH] Switzerland ............... 2973/96

[51] Int. Cl.$^6$ .................................................. H02K 37/00
[52] U.S. Cl. ................................. 310/49 R; 310/40 MM
[58] Field of Search .......................... 310/49 R, 40 MM

[56] References Cited

U.S. PATENT DOCUMENTS

| | | | |
|---|---|---|---|
| 4,546,278 | 10/1985 | Xuan | 310/49 R |
| 4,855,629 | 8/1989 | Sato | 310/49 R |
| 4,969,133 | 11/1990 | Triponez | 368/80 |

FOREIGN PATENT DOCUMENTS 0 698 957  2/1996  European Pat. Off. .

OTHER PUBLICATIONS

Patent Abstracts of Japan vol. 005, No. 066 (E–055), May 2, 1981 & JP 56 015154 A (Rhythm Watch Co. Ltd), Feb. 13, 1981.

*Primary Examiner*—Nestor Ramirez
*Assistant Examiner*—Judson H. Jones
*Attorney, Agent, or Firm*—Griffin, Butler, Whisenhunt & Szipl, LLP

[57] ABSTRACT

The two-phase electromechanical transducer (2) comprises a stator (4) formed by a planar structure (12) and two cores (14, 16) respectively carrying two coils (18, 20). The planar structure defines three magnetic stator poles (22, 23, 24) and has a stator hole (48) closed on itself and within which the two coils are situated relative to a projection in the plane of this planar structure.

10 Claims, 3 Drawing Sheets

TWO-PHASE ELECTROMECHANICAL TRANSDUCER AND ELECTROMECHANICAL DEVICE INCLUDING AT LEAST ONE SUCH TRANSDUCER

The present invention concerns a two-phase electromechanical transducer whose stator has a planar structure and whose rotor includes a permanent magnet, in particular a bipolar magnet. In particular, the present invention concerns electromechanical transducers of small dimensions, in particular adapted to horological applications.

European Patent No 0 393 606 discloses an electromechanical device formed of two two-phase transducers whose respective stators are formed by a common plate made of magnetic material. This common plate is used in particular for mounting various elements of the electromechanical device and in particular for mounting a plate for stiffening the common plate of the two two-phase transducers.

First, it is to be noted that the man skilled in the art knows similar two-phase transducers to the two two-phase electromechanical transducers disclosed in this document. These electromechanical transducers are characterised, as appears in FIG. 1 of European Patent No 0 393 606, in that the stator defines three magnetic stator poles two of which are magnetically connected to the first ends of two cores carrying respectively two coils and the third is connected to the second ends of these two cores. For this purpose, the third pole has a central leg arranged so as to form two magnetic contact ears for said second ends of the two cores.

As is clear from the electromechanical device disclosed in the aforementioned document, one of the two magnetic stator poles connected to a first end of one of the two cores is extended so as to use the planar structure forming the stator of this transducer for mounting various elements of said electromechanical device, in particular a pipe used for mounting hands used as analog display means. Moreover, European Patent No 0 393 606 proposes arranging two two-phase transducers having a common magnetic stator pole, which extends to form a base plate used for mounting various elements as has just been described.

The electromechanical device disclosed in the aforementioned document has two major drawbacks. First, the base plate used to form the two stators of the two two-phase transducers is fragile, the aforementioned third magnetic stator poles being able to easily bent, thus leading the cores of the two-phase transducers carrying the supply coils to flex therewith. Next, the magnetic stator poles which are not common to the two transducers may undergo rotation in the general plane of the base plate forming the stator by deformation of the plate. In order to overcome these rigidity problems of the plate forming the stators of the two two-phase transducers, the aforementioned document proposes providing a reinforcement plate to stiffen the electromechanical device partially shown in FIG. 1 of this document.

Secondly, the arrangement of the electromechanical device according to European Patent No 0 393 606 is very limiting for the designer, in particular for the watch designer. Four supply coils are situated at the periphery of the plate forming the two stators. Thus, the magnetic stator pole common to the two transducers which extends to be used for mounting various elements can only occupy a restricted area given that the supply coils are situated outside the plate forming the stators of the two transducers. It will be noted that the problem is identical for an electromechanical transducer including a single two-phase transducer of the type described here. Since the two supply coils are situated outside the stator plate, the first or second magnetic stator pole can only extend in one given direction. The designer of such a mechanical device is thus restricted in his possibilities for the design and arrangement of the various elements of the device including one or more two-phase transducers of the type described hereinbefore. This is particularly critical for devices which have to be confined in a relatively limited space, in particular in a watch case. The watch designer must take account of the space requirement of the clockwork movements which he designs and the arrangement of the electromechanical transducer is a real problem with which he is constantly confronted in designing analog quartz watches.

The object of the present invention is to overcome the drawbacks described hereinbefore.

The present invention therefore concerns an electromechanical transducer including:

a stator made of magnetic material;

a rotor including a permanent magnet;

two coils;

said stator including a planar structure and first and second cores around which said two coils are respectively mounted, the planar structure defining first, second and third magnetic stator poles whose respective polar expansions define a hole through which the rotor passes, the permanent magnet of such rotor being magnetically coupled to the three polar expansions. The first and second cores respectively connect the first and second magnetic stator poles to the third magnetic stator pole. This transducer is characterised in that the two coils are situated within a stator hole provided in the planar structure relative to a projection in the general plane of this planar structure, the edge of this stator hole being closed on itself.

As a result of the features of the electromechanical transducer according to the invention, the stator is stiffened without the addition of extra elements and the planar structure Any extend in all directions according to the requirements of the designer. In particular, the rotor and the coils of the two-phase transducer may be freely arranged in any area selected in accordance with the design imperatives of the device with which the two-phase electromechanical transducer is associated.

The aforementioned part of the planar structure defining the third magnetic stator pole surrounds, in projection in the general plane of this planar structure, the unit formed by two parts of this planar structure respectively defining the first and second magnetic poles and by the two aforementioned coils.

As a result of this particular feature, the hole through which the rotor of the transducer may be provided at any location in the planar structure defining the stator and not only at the periphery of said planar structure.

The present invention concerns secondly, an electromechanical device including a plurality of electromechanical transducers whose plurality of respective stators are partially formed by a common planar structure defining a plurality of holes through which pass respectively a plurality of rotors of said plurality of electromechanical transducers, this electromechanical device being characterised in that at least one of the plurality of transducers is made according to the transducer of the invention described hereinbefore.

The present invention will be described in detail hereinafter with the aid of the following description, made with reference to the annexed drawings given by way of non-limiting examples, in which.

Figure 1:
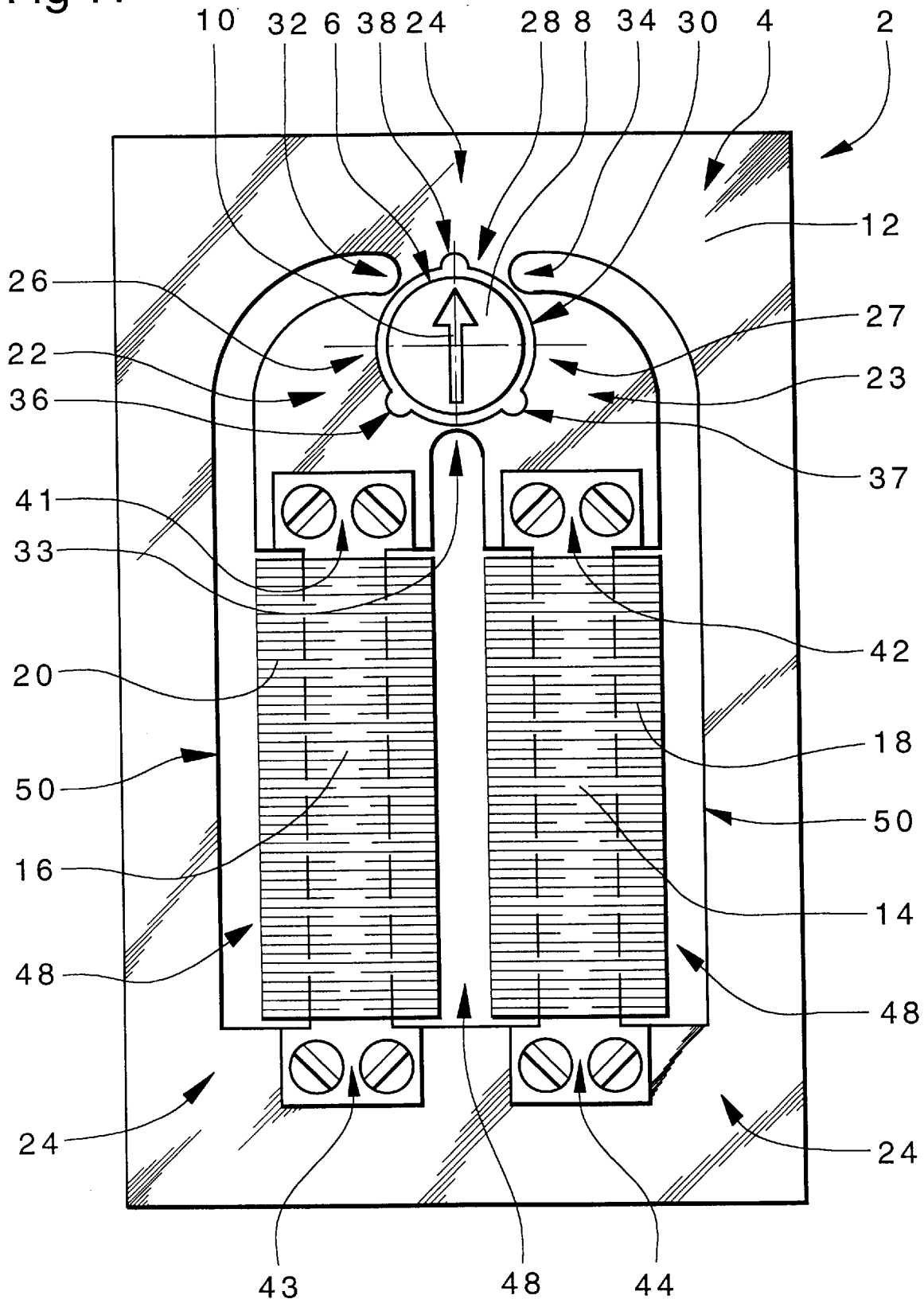
FIG. 1 shows schematically a top view of the two-phase electromechanical transducer according to the invention.

In FIG. 1, the two-phase electromechanical transducer 2 includes a stator 4 made of a magnetic material and a rotor 6 of which only the bipolar permanent magnet 8 has been shown in order to simplify the drawings, the magnetic axis of this bipolar permanent magnet being represented by the arrow 10. Stator 4 includes a planar structure 12 made of a soft magnetic material and two cores 14 and 16 carrying respectively two supply coils 18 and 20. Planar structure 12 defines three magnetic stator poles 22, 23 and 24 whose three polar expansions 26, 27 and 28 define a hole 30 in stator plate 12 within which is arranged bipolar permanent magnet 8. The three magnetic stator poles 22, 23 and 24 are separated from each other by means of necks of high reluctance 32, 33 and 34. In the alternative shown in FIG. 1, three positioning notches 36, 37 and 38 are provided on the edge of hole 30.

Permanent magnet 8 is magnetically coupled to the three magnetic stator poles by means of the three polar expansions. Cores 14 and 16 are connected at their first end 41, 42 respectively to the two magnetic stator poles 22 and 23. The second ends 43 and 44 of these two cores are both connected to the third magnetic stator pole 24 used to close the magnetic flux propagating in cores 14 and 16.

The two coils 18 and 20 are situated, in projection in the general plane of planar structure 12, within a stator hole 48 provided in planar structure 12. The edge 50 of stator hole 48 is closed on itself. Moreover, stator hole 48 partially defines the two magnetic stator poles 22 and 23.

According to a preferred feature, the portion of the planar structure 12 defining third magnetic stator pole 24 surrounds the unit formed by the two coils 18 and 20 and by two parts of this planar structure respectively defining first and second magnetic poles 22 and 23, the portion defining the third magnetic stator pole 24 and the two parts defining the first and second magnetic poles 22 and 23 being projected in the general plane of the planar structure 12 of the two-phase electromechanical transducer. Thus hole 30 and permanent magnet 8 situated within are also surrounded by magnetic stator pole 24. In addition to the advantage of arranging such a transducer in an electromechanical device and the advantage of the rigidity of such a transducer, the part of stator plate 12 defining magnetic stator pole 24 forms a magnetic shield for the transducer given that the external magnetic flux propagating in the plane of planar structure 12 are driven by magnetic stator pole 24 without any coupling with permanent magnet 8 whatever the direction of propagation of such external magnetic flux.

Figure 2:
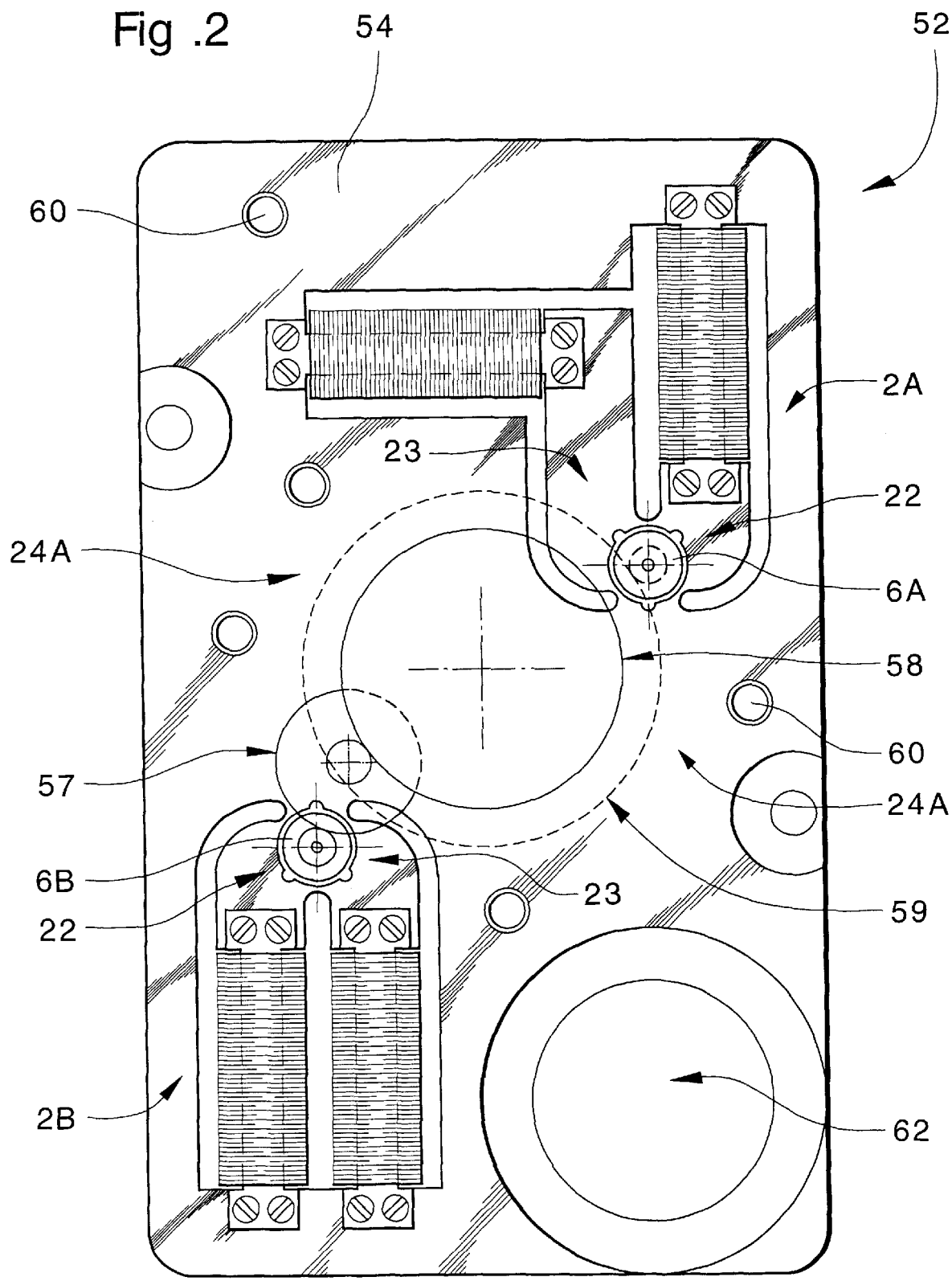
FIG. 2 is a top view of a first embodiment of an electromechanical device according to the invention.

Referring to FIG. 2, a first embodiment of the electromechanical device according to the invention will be described.

The electromechanical device 52 includes a base plate 54 made of soft magnetic material used to form jointly the respective stators of two two-phase electromechanical transducers 2A and 2B, both similar to the transducer described hereinbefore with reference to FIG. 1. These transducers 2A and 2B will not be described here again in detail.

Magnetic stator pole 24A which is common to the two transducers 2A and 2B forms the magnetic stator pole of each of these two transducers which surround, in projection in the general plane of plate 54, magnetic stator poles 22 and 23 of each of these two transducers which were described previously. Common magnetic stator pole 24A is thus used to close the magnetic flux of the two transducers 2A and 2B which are however magnetically decoupled from each other.

The man skilled in the art will understand immediately that plate 54 may be used as stator plate for a plurality of two-phase electromechanical transducers according to the invention. Moreover, the arrangement of each transducer in the surface defined by plate 54 is free and determined by the designer of the electromechanical device according to the invention. Plate 54 is used for mounting, at least partially, several elements, in particular wheels 57, 58 and 59. Wheels 57 and 59 are respectively mechanically coupled to respective rotors 6A and 6B of the two transducers 2A and 2B.

In a conventional manner, plate 54 includes construction holes 60, which may or may not be threaded, used for mounting several elements. Moreover, plate 54 has an indentation (or a recess) for housing a battery for supplying transducers 2A and 2B given that, in the case described here, they are used as a motor for driving wheels 57, 58 and 59.

It will be noted that rotors 6A and 6B are mounted head-to-tail, i.e. they are mounted in opposite directions of construction. Thus, according to a similar construction or design to that described in European Patent No 0 393 606, the two transducers drive two hands mounted coaxially to each other.

Figure 3:
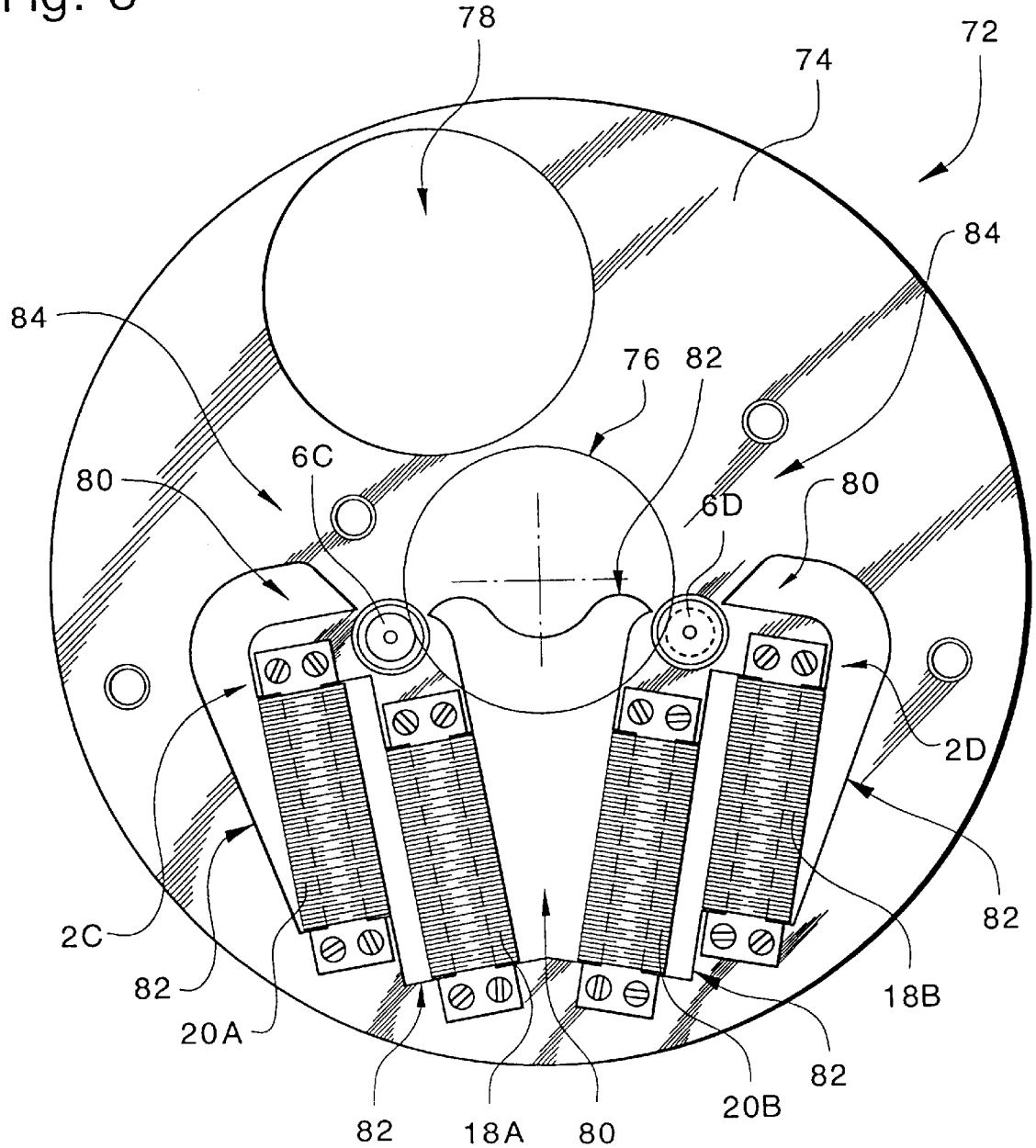
FIG. 3 is a schematic top view of a second embodiment of an electromechanical device according to the invention.

Referring to FIG. 3, a second embodiment of the electromechanical device according to the invention will be described.

The electromechanical device 72 includes a base plate 74 formed of a magnetic material. This base plate 74 forms the respective stators of two two-phase electromechanical transducers 2C and 2C of equivalent construction to the transducer described hereinbefore with reference to FIG. 1. The two rotors 6C and 6D of the two respective transducers are mechanically coupled to two coaxial wheels 76 arranged on either side of plate 74. An opening 78 is provided in plate 74 for housing a supply battery therein. Two-phase transducers 2C and 2D will not be described again here in detail.

This second embodiment of an electromechanical device differs essentially from the first embodiment described with reference to FIG. 2 in the two two-phase transducers 2C and 2D have their coils 18A, 20A, 18B and 20B situated, in projection in the general plane of base plate 74 forming the strator plate, within a single same stator hole 80 whose edge 82 is closed on itself. Magnetic stator pole 84 which is used to close the magnetic flux propagating in any one of the four cores respectively surrounded by the aforementioned four coils is a common magnetic pole to the two transducers 2C and 2D. Thus, base plate 74 is used as a common stator to the two two-phase transducers 2C and 2D as in the case of the first embodiment described in FIG. 2.

The present invention is not limited to the embodiments described hereinbefore, the man skilled in the art being able to provide alternative designs and arrangements of the transducers as a function of the design requirements of the electromechanical devices. It will be noted in particular that the cores carrying the coils may be curved.

By way of example, the electromechanical devices described in FIGS. 2 and 3 form analog display means used to display the value of at least one determined variable. In particular, the variable displayed by these electromechanical devices is the time.

What is claimed is:

1. A two-phase electromechanical transducer including:
   a stator made of magnetic material;
   a rotor including a permanent magnet;
   two coils;
said stator including a planar structure and first and second cores around which said two coils are respectively mounted, said planar structure defining first, second and third magnetic stator poles whose respective polar expansions define a hole through which the rotor passes, the permanent magnet of such rotor being magnetically coupled to the three polar expansions, said first and second cores respectively connecting the first and second magnetic stator poles to said third magnetic stator pole, wherein said two coils are situated within a stator hole provided in said planar structure relative to a projection in the general plane of this planar structure, the edge of this stator hole being closed on itself.

2. An electromechanical transducer according to claim 1, wherein the portion of the planar structure defining said third magnetic stator pole surrounds the unit formed by said two coils and by two parts of this planar structure respectively defining said first and second magnetic poles, said portion defining said third magnetic stator pole and said two parts defining said first and second magnetic poles being projected in the general plane of the planar structure of the two-phase electromechanical transducer.

3. An electromechanical transducer according to claim 2, wherein said hole through which passes said rotor has an edge closed on itself, said hole and said stator hole defining high reluctance necks magnetically insulating said magnetic stator poles, said planar structure being formed in a single piece.

4. An electromechanical transducer according to claim 1, wherein said stator defines a base plate onto which elements of an electromechanical device are at least partially mounted, at least one of said element being mechanically coupled to said rotor of said electromechanical transducer.

5. An electromechanical device including a plurality of electromechanical transducers whose plurality of respective stators are partially formed by a common planar structure defining a plurality of holes through which pass respectively a plurality of rotors of said plurality of electromechanical transducers, wherein at least one of said plurality of transducers includes:

a stator made of magnetic material;

a rotor including a permanent magnet;

two coils;

said stator including a planar structure and first and second cores around which said two coils are respectively mounted, said planar structure defining first, second and third magnetic stator poles whose respective polar expansions define a hole through which the rotor passes, the permanent magnet of such rotor being magnetically coupled to the three polar expansions, said first and second cores respectively connecting the first and second magnetic stator poles to said third magnetic stator pole, said two coils being situated within a stator hole provided in said planar structure relative to a projection in the general plane of this planar structure, the edge of this stator hole being closed on itself.

6. An electromechanical device according to claim 5, wherein said common planar structure is used as a base plate onto which elements of said electromechanical device are at least partially mounted.

7. An electromechanical device according to claim 5, characterised in that each rotor of said plurality of rotors is mechanically coupled to one of said elements of said electromechanical device.

8. An electromechanical device according to claim 5, wherein at least two of said transducers each includes:

a stator made of magnetic material;

a rotor including a permanent magnet;

two coils;

said stator including a planar structure and first and second cores around which said two coils are respectively mounted, said planar structure defining first, second and third magnetic stator poles whose respective polar expansions define a hole through which the rotor passes, the permanent magnet of such rotor being magnetically coupled to the three polar expansions, said first and second cores respectively connecting the first and second magnetic stator poles to said third magnetic stator pole, said two coils being situated within a stator hole provided in said planar structure relative to a projection in the general plane of this planar structure, the edge of this stator hole being closed on itself, the cores of said two transducers and the respective coils which surround them being arranged in one and the same hole of said planar structure common to those two transducers.

9. An electromechanical device according to claim 1, wherein said device forms an analog indicator for displaying the value of at least a determined variable.

10. An electromechanical device according to claim 9, wherein it forms the movement of a timepiece, said at least displayed variable being the time.

* * * * *